Dec. 3, 1946.  J. H. PORTEUS  2,411,978
RAILWAY TRUCK
Filed Feb. 9, 1944  3 Sheets-Sheet 2

INVENTOR
John H. Porteus
BY
ATTORNEY

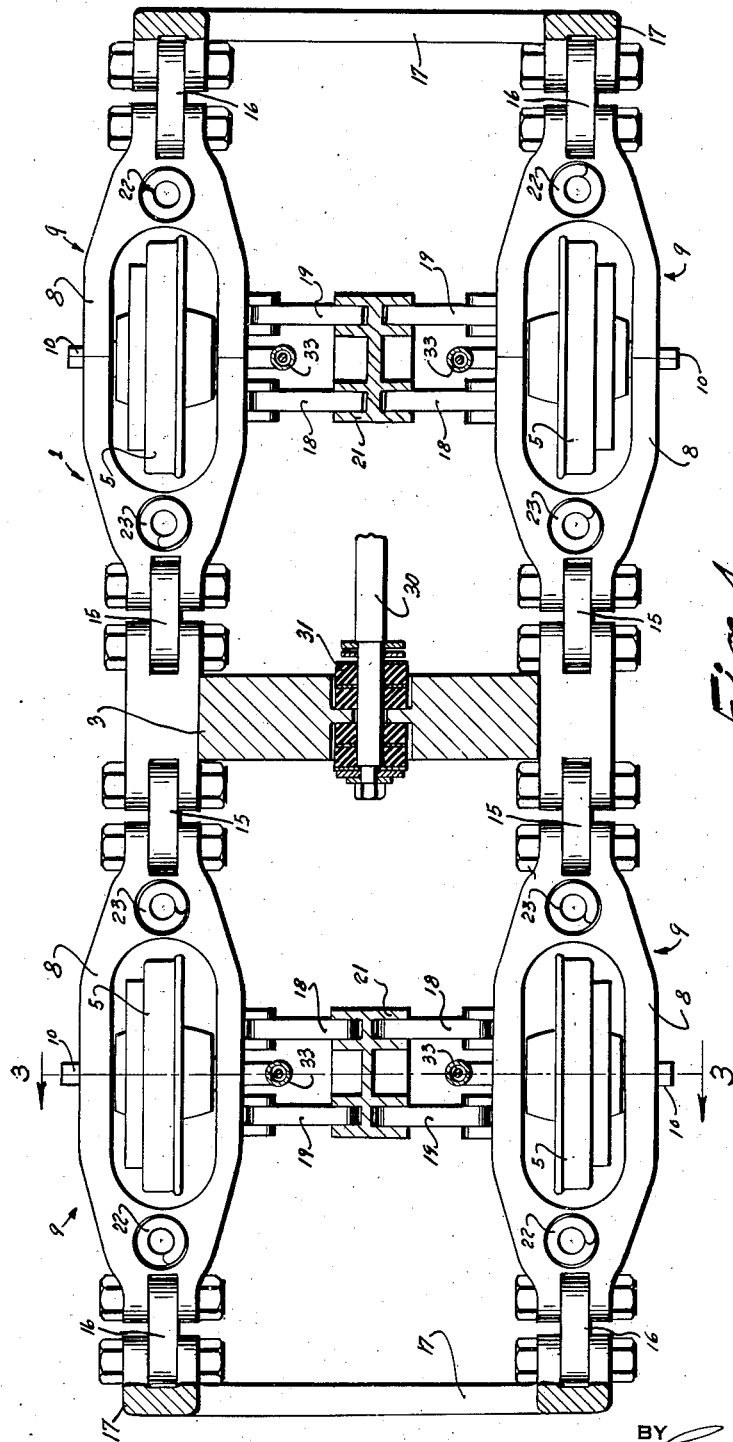

Patented Dec. 3, 1946

2,411,978

UNITED STATES PATENT OFFICE 2,411,978

RAILWAY TRUCK

John H. Porteus, Wellesley, Mass., assignor to The Baldwin Locomotive Works, a corporation of Pennsylvania Application February 9, 1944, Serial No. 521,722

2 Claims. (Cl. 105—180)

This invention relates generally to railway trucks and more particularly to trucks for high speed passenger service, although the truck herein disclosed is not necessarily limited to such class of service.

It is an object of my invention to provide a railway truck of the type having wheels with individual axles supported in separate wheel frames which are guided in an improved manner for effectively maintaining the wheels in a substantially vertical plane throughout all vertical movements of either the wheels or the main truck frame. Another object is to provide improved guiding means for maintaining the individual wheel frame substantially parallel to the truck frame at all times whereby vertical springing may be employed with uniform action at a plurality of points on each individual wheel frame. A further object is to provide an improved truck that has a high degree of flexibility combined with ruggedness and stability of operation.

Other objects and advantages will be more apparent to those skilled in the art from the following description of the accompanying drawings in which.

Figure 2:
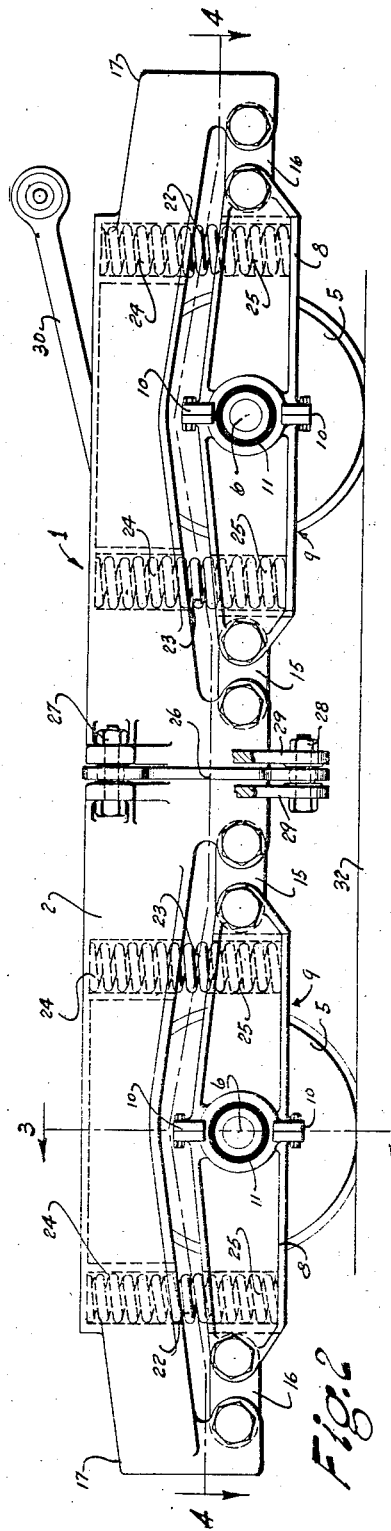
Fig. 2 is a side elevation.
Figure 3:
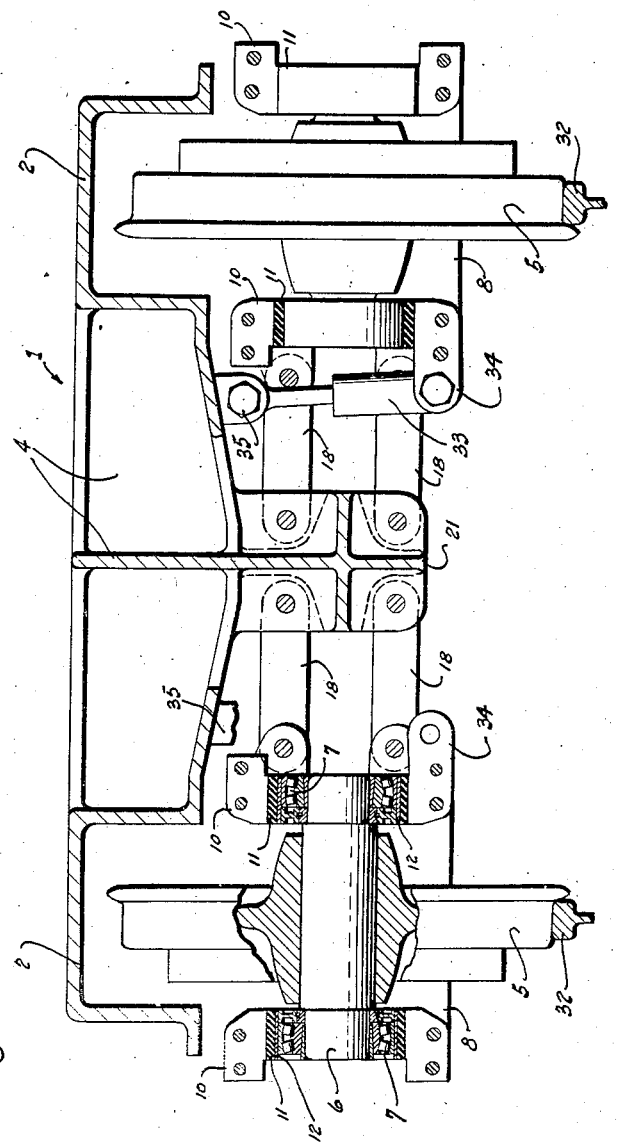

Fig. 3 is a transverse section taken substantially on the lines 3—3 of Figs. 2 and 4; and Fig. 4 is a horizontal sectional plan view taken substantially on the line 4—4 of Fig. 2.

Figure 1:
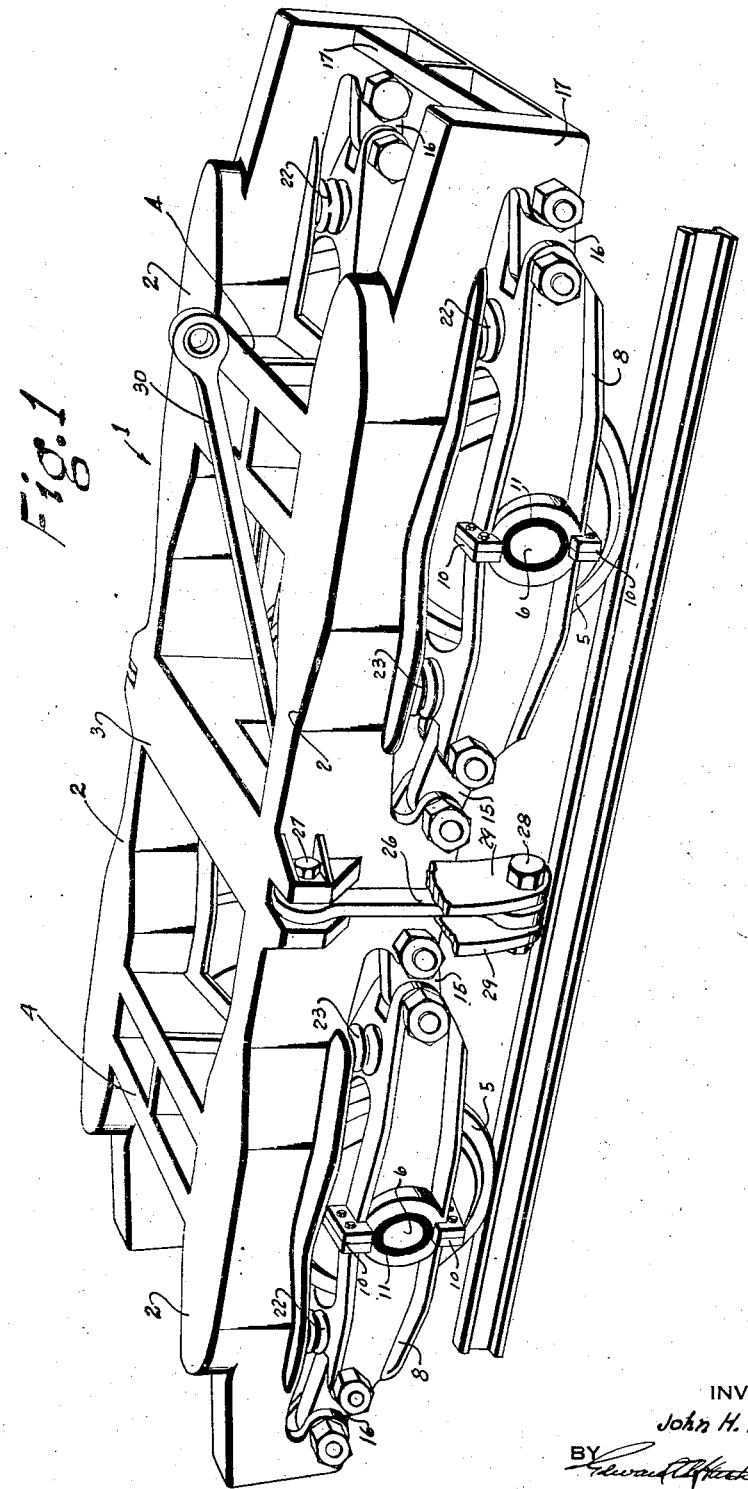
Fig. 1 is a perspective of my improved truck.

In the particular embodiment of the invention disclosed herein, I have shown in Fig. 1 my improved truck in which a main truck frame generally indicated at 1 has side pieces 2 connected by a transom 3 and end sills 4. Inasmuch as the truck is symmetrical about both the longitudinal and transverse centerlines, only one wheel assembly will be described and similar parts of the other assemblies will be given the same reference numbers. The wheels 5 are specifically shown as four in number, although the principles of the truck disclosed herein are equally applicable to a larger number of wheels if desired. The wheels are mounted upon individual axles 6, Fig. 3, journalled in suitable bearings 7 located within the yokes 8 which together form a wheel frame generally indicated at 9, Fig. 4. More specifically the two yokes are split along any suitable angle to provide a mating plane containing the wheel axis and bolted together by flanges 10, Fig. 2, at the inner and outer ends of each axle. The split is specifically shown as vertical merely for purposes of illustration. The split flanges thereby allow the bearing 7 and wheels to the readily removed.

A rubber sleeve 11 is also interposed between the outer bearing race and the yoke to provide the sole means by which the wheel and axle may laterally yield. The rubber sleeve may, if desired, be vulcanized to a suitable metal sleeve 12 which receives the outer race with a pressed fit and the bearing, in turn, is suitably removably secured to the axle 6, it being understood that the wheel is pressed upon the axle. To maintain the wheel frame 9 in a substantially longitudinal direction and to transmit draft forces from the main truck frame to the wheels, I provide longitudinal links 15 and 16 pivotally connected to each end of the wheel frame and to the side wheel pieces 2 and end pieces 17 of the main frame. The wheel frames are transversely guided by two sets of pantograph links, each set comprising a pair of links 18, 18, Fig. 3, disposed one above the other, and the other pair being indicated at 19, Fig. 4. These two pairs of parallel links are pivotally connected to the respective yoke pieces 8 of frames 9 and to a boss generally indicated at 21, Fig. 3, projecting downwardly from the center of the end sills 4. The two pairs of links are also sufficiently spaced longitudinally along the axis of the truck to assure maximum stability in cooperation with the longitudinal supporting action of links 15 and 16, Fig. 2. It will be understood that each wheel assembly, including the wheel axle and wheel frame 9, is similarly supported by links such as 15 and 16 and the two pairs of parallel links 18 and 19.

Coil compression springs 22 and 23 are interposed between the ends of each wheel frame 9 and the side wheel pieces 2, these springs being disposed in suitable pockets 24 and 25 of the truck and wheel frames. The car body is suitably hung from the truck frame in a manner not specifically constituting a part of my present invention but which is referred to herein in order to complete an understanding of my particular type of truck. To this end swing hangers such as 26 are supported at their upper ends to the truck frame by pivot pins 27 while their lower ends are pivotally connected as at 28 to car body arms 29 (the car being omitted for sake of clarity). A tongue 30 is suitably yieldably connected at 31, Fig. 4, to the truck transom while the upper end of the tongue is normally connected to a suitable pivot pin of the car body.

The pivotal connections of the pantograph arms insure that the wheel frames will be firmly yet flexibly connected to the truck frame and also the pivotal connections of the links 15 and 16 are of such a nature that they also provide a firm but flexible connection in a longitudinal direction. Relative vertical movement between the truck and wheel frames tending to increase the distances between the pivot points of each link can be taken care of by mounting the pivot pins in rubber bushings. By virtue of having the pivot points in a common horizontal line the change in distance between the pivot points is reduced to a minimum.

My improved parallelogram type control of the wheel frames is especially useful in the elimination of pedestal ways and the friction and other objections incident thereto. The improved parallel arrangement is also particularly adapted for cooperation with hydraulic snubbers 33 of the piston and cylinder type in which the cylinder is pivotally connected at 34 to a suitable extension of the wheel frame while the piston is pivotally connected at 35 to the truck frame. These hydraulic snubbers are preferably located between each of the two pairs of parallel links 18 and 19 as generally shown in Fig. 3. The snubber 33 is omitted from the left side of Fig. 3 for sake of clarity. As a result of this arrangement, the hydraulic snubbers function independently and free of any frictional damping that would ordinarily be associated with pedestal ways.

From the particular disclosure herein of my improved truck, it is seen that I have provided a very rugged and yet flexible truck in which individually sprung wheel and axle assemblies may be effectively employed with minimum disturbance between the various wheels as they individually ride over irregularities in the tracks or strike impediments therein such as rail joints.

It will of course be understood that various changes in details of construction and arrangement of parts may be made by those skilled in the art without departing from the spirit of the invention as set forth in the appended claims.

I claim:

1. A railway truck comprising, in combination, a truck frame, a plurality of individual wheel and axle assemblies, wheel frames in which the axles of said assemblies are supported, said wheel frames having a pair of mated yokes encircling a wheel and which are removably connected together along a plane intersecting the wheel axis, means for guiding said wheel frames relative to said truck frame including transversely extending links connected at their inner ends to the truck frame and at their outer ends to the portion of the wheel frame yoke disposed on the inner side of the wheels.

2. The combination set forth in claim 1 further characterized by the provision of longitudinal links at each of the wheel frame pivotally connected thereto and to the truck frame.

JOHN H. PORTEUS.